April 16, 1957 W. A. BLACK ET AL 2,788,868
SPEED RESPONSIVE BRAKE
Filed April 4, 1955 2 Sheets-Sheet 1

Inventors
WILLIAM A. BLACK
EVERETT J. WEST
*H. H. Hulse*
Attorney

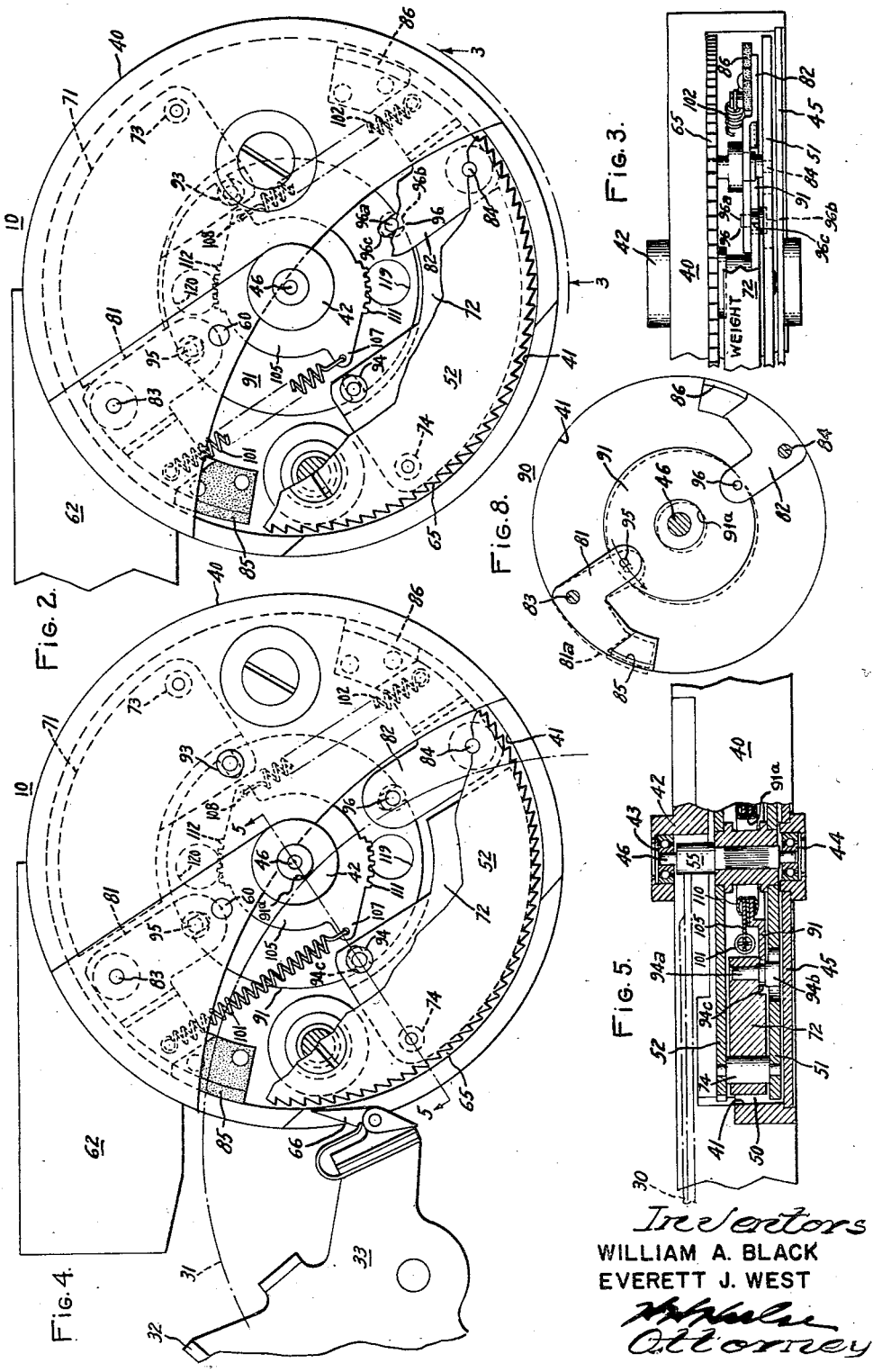

2,788,868
Patented Apr. 16, 1957

2,788,868

SPEED RESPONSIVE BRAKE

William A. Black, Montclair, N. J., and Everett J. West, Huntington, N. Y., assignors to General Time Corporation, New York, N. Y., a corporation of Delaware Application April 4, 1955, Serial No. 499,059

6 Claims. (Cl. 188—184)

The present invention relates to speed responsive brakes having particular application as a mechanical speed governor, and more particularly, to a mechanical governor especially suited for use with a portable recording apparatus and the like.

It is a principal object of the present invention to provide a mechanical governor capable of accurately controlling speed when operated in any position and under the conditions of shock and vibration to which small portable devices may be subjected. It is a more specific object to provide a governor having a plurality of brake shoes and in which there is novel provision for insuring balancing of the braking load equally between the shoes under all conditions. It is a related object to provide a governor having a plurality of flyweights and in which the centrifugal forces exerted thereby are efficiently added together before being applied to the brake shoes.

It is a further object related to the foregoing to provide a speed responsive brake which not only insures equal braking between the brake shoes when the brake is new but which provides for automatic takeup of either brake shoe incident to wear. It is a correlative object to provide a brake-type governing mechanism in which it is not necessary to adhere to close tolerances during manufacture but in which equalization of the forces exerted at the brake shoes is achieved in spite of minor differences in the size or shape of the parts, thereby making the governor ideally suited to quality production.

It is another object of the present invention to provide a speed governor in which the speed setting may be easily and quickly changed and which will hold accurately to the set value.

It is a further object to provide a constant speed governor which is particularly well adapted for controlling the speed of a spring motor used in a miniature recorder. It is a related object to provide a speed governor having a compact unit construction, which may be conveniently mounted, and which may be successfully employed in almost all types of spring-wound constant speed devices. While the governor has unique advantages in low power mechanisms, it is nevertheless capable of operating consistently and without overheating in systems where appreciable amounts of power must be dissipated.

Finally, it is an object of the invention to provide a governor which is simple and inexpensive to construct and maintain and which may be operated for long periods of time without care or attention.

Other objects and advantages of the invention will become apparent upon reading the attached detailed description and upon reference to the drawings in which:

Fig. 2 is a plan view of the governor shown in Fig. 1 with one of the rotor frame plates broken away to reveal the internal construction.

Fig. 3 is a fragmentary elevation taken along the line 3—3 in Fig. 2.

Fig. 4 is similar to Fig. 2 but shows the governor following a starting impulse and with brake shoes pressing outwardly in engagement with the drum.

Fig. 5 is a partial section taken along the line 5—5 in Fig. 4.

Fig. 8 is a diagram showing the bodily movement of the floating link assembly serving to equalize the braking force applied to the two brake shoes.

Figure 1:
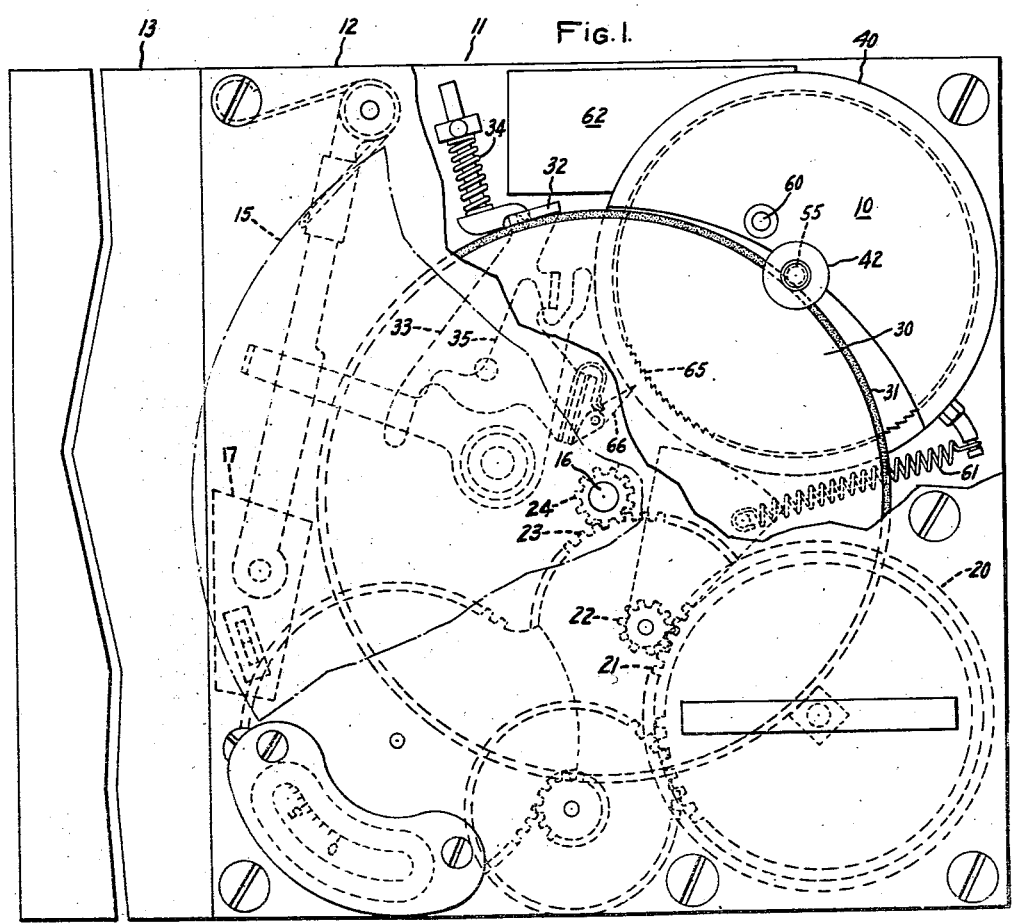
Figure 1 is a simplified rear view of a portable recording device employing a governor constructed in accordance with the present invention and with certain parts omitted for the sake of simplicity.

While the invention has been described herein in connection with the preferred embodiment, it will be understood that we do not intend to limit the invention to such embodiment but intend to cover all modifications and alternative constructions and uses falling within the spirit and scope of the appended claims.

Turning now to the drawings, a governor constructed in accordance with the present invention is indicated at 10, being mounted for purposes of illustration in a miniature recording device 11. The recording device is covered in detail in copending application, Serial No. 502,429 filed April 29, 1955 and to which reference is made for the details of construction. For present purposes, it will suffice to say that the recorder includes a mechanical portion 12 and an electronic portion 13. Centrally arranged on the mechanical portion of the recorder is a grooved disc shown in outline at 15 and mounted on a record drive shaft 16. Cooperating with the record 15 is a transducer head which is indicated at 17, the head being arranged to engage the underside of the disc 15.

For the purpose of driving the disc 15, a spring motor indicated generally at 20 is used having an output gear 21 which engages a pinion 22 closely coupled to a gear 23. Meshing with the gear 23 is a pinion 24 which is fixed to the shaft 16. Also mounted on the record drive shaft 16 is a governor wheel 30 having an edge 31. Engaging the edge 31 is a brake shoe 32 mounted on a pivoted impulse arm 33 having an overcenter spring 34. As set forth in Fig. 1 the impulse arm is in its "off" or braked position with the brake shoe 32 in contact with the edge of the governor wheel 30. For the purpose of moving the impulse arm 33 to its opposite or "on" position a manually operated action lever 35 is provided, having a lost motion connection with the impulse arm, all as covered in the above mentioned application.

Turning attention to the governor 10, the details of which are set forth in Figs. 2–5, it will be noted that it includes a cylindrical housing 40 having an inside wall 41 forming a stationary brake drum. Partially enclosing one side of the governor and forming an integral part of the housing 40 is a bracket 42 mounting an antifriction bearing 43. Axially alined therewith is a second bearing 44 which is mounted in a circular cover plate 45. Journaled in the bearings 43, 44 is a rotor shaft 46. Rigidly mounted with respect to the shaft is a rotor frame 50, consisting of a "lower" disc 51 and an "upper" disc 52. The movable governor parts, to which reference will shortly be made, are mounted between the plates 51, 52.

For the purpose of driving the shaft 46, the same is provided with a governor spindle 55, the governor being so mounted and arranged that the spindle 55 engages the edge 31 of the governor wheel 30. Preferably the governor housing is bodily pivoted on an eccentric pivot 60 and a biasing spring 61 is provided to constantly urge the governor spindle 55 against the edge of the governor wheel. Static balance about the pivot 60 is obtained by use of a counterbalancing weight 62 (Fig. 1) fastened to the governor housing. As a result of the governing action to be described, and because of the close coupling between the record and the spindle 55, the speed of the record is maintained constant. However, for bringing the governor rotor and other rotating parts quickly up to speed, the governor includes a toothed impulse wheel 65 which is engaged by a pawl 66 mounted on the impulse arm 33. Consequently, when the impulse arm is flipped to the opposite or "on" position, illustrated in Fig. 4, the impulse wheel is subjected to a rapid wiping action by the pawl 66, as covered in detail in the above copending application. When such impulsing is not necessary or desired, the toothed wheel 65 may be omitted.

For responding to the speed of rotation of the spindle 55, a pair of diametrically arranged flyweights 71, 72 are provided on the rotor frame plates 51, 52. These weights are of arcuate shape and are pivoted at their ends by pivots 73, 74, respectively. As shown in Fig. 5, the pivots serve to support the weights for radial movement in response to centrifugal force. Braking in response thereto is accomplished by brake levers 81, 82 which are in the shape of bell cranks individually pivoted to the frame plates 51, 52 by diametrically spaced pivots 83, 84. The brake levers have brake shoes 85, 86 of wear-resisting material, the shoes being secured to the brake levers by riveting or the like.

In accordance with the present invention a floating link assembly is interposed between the weights and the shoes, so arranged that the centrifugal forces developed in the weights 71, 72 are added together, with the sum thereof being divided between the two brake shoes 85, 86 in such proportion as to produce equalized braking forces. To accomplish this the brake assembly, indicated generally at 90, includes a floating control disc 91 of annular shape centered about the central shaft 46 and alined between the frame plates 51, 52. As shown the control member or disc 91 has an enlarged opening 91a which enables limited transaxial movement of the control member relative to the shaft incident to bodily rocking of the control member about a pivot on its periphery. The importance of this will be made clear as the discussion proceeds.

The disc 91 is pivotally coupled to the weights 71, 72 by diametrically opposed pivots 93, 94. As shown in Fig. 5, the pivot connections provide a pin-and-slot type of engagement between the weights and the control disc. In the case of the pivot connection 94, for example, it preferably consists of a pin 94a having an enlarged head 94b for supporting the control disc, the disc being slotted or notched, as indicated at 94c. Such construction provides radial freedom and insures that pure torsional force is applied to the floating control disc.

For the purpose of transmitting the torsional force from the weights to the brake shoes, the brake levers 81, 82 are pivoted to the control disc by pivots 95, 96. The pivot engagement is similar to that previously referred to at 94. The pivot 96, for example, includes a pin 96a having a head 96b which cooperates with a slot 96c formed in the control disc. This insures that reaction force from the brake levers is purely torsional for all positions of the brake levers relative to the control disc.

In order to establish an equilibrium speed, tension springs 101, 102 are provided for holding the weights and the brake shoes inwardly. The spring 101 is eccentrically connected to the brake lever 81 and the spring 102 is similarly connected to the brake lever 82, with the inner ends of the springs being indirectly anchored to the control disc 91.

Figure 6:
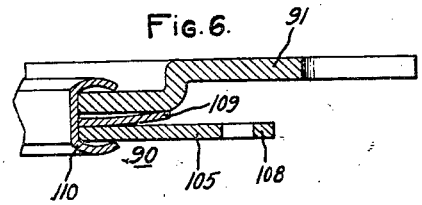
Fig. 6 is an enlarged fragmentary section taken through the floating link assembly.

In accordance with one of the more detailed features of the present invention, the tension springs are coupled to the control disc by means of an auxiliary or adjusting disc 105 concentric with the control disc and having a stiff frictional connection therewith. The adjusting disc is of annular shape having a pair of ears 107, 108 to which the springs are respectively attached. To provide the desired frictional engagement, the control disc 91 and the adjusting disc 105 have a wavy spring 109 sandwiched between them. For taking up the force of reaction, a central rimlike member 110 having a C-shaped cross-section is used, as shown in the enlarged detail view, Fig. 6. Since the area in frictional contact is large and since the force may, by proper choice of spring, be made quite high, it will be apparent that the adjusting disc 105 will tend to remain in an adjusted position with respect to the control disc 91 during all normal operation and until one member is rotated relative to the other.

Figure 7:
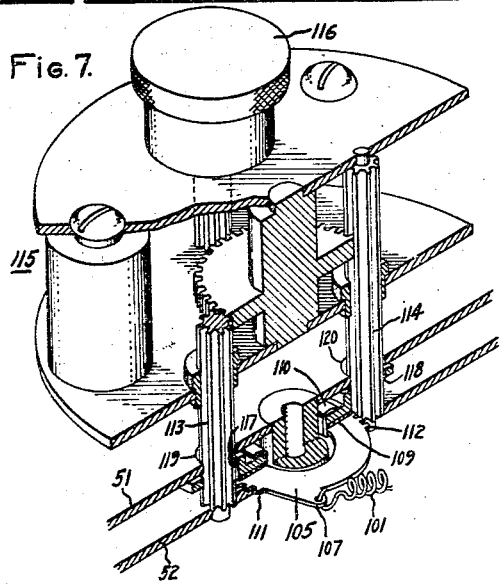
Fig. 7 is a fragmentary perspective showing adjustment of the governor by an adjusting tool.

For the purpose of turning the adjusting disc against the force of friction, it is one of the features of our device that circular racks are provided on the adjusting member, and apertures are provided in the control disc and adjacent frame plate for permitting insertion of adjusting pinions. As shown in Fig. 7, the racks indicated at 111, 112 have cooperating pinions 113, 114, forming a part of adjusting tool 115 having a knob 116. For permitting entry of the pinions, the control disc is apertured at 117, 118 and the frame plate 51 has corresponding or registering apertures 119, 120. The function of the tool 115 will be clear from the drawing. Taking the pinion 113 by way of example, it will be noted that it is threaded through the apertures 117, 119 in the control disc and frame plate, respectively, into engagement with rack 111. Thus the control disc is securely locked in place during the adjusting operation and it is not necessary to hold any of the parts against rotation while the adjustment is being performed. With the mechanism thus "locked up," the pinions 113, 114 may then be turned through a small angle to produce a desired difference in the equilibrium speed. It will be apparent that increasing the spring tension will tend to increase the equilibrium speed, i. e., the speed at which the brake shoes come into braking engagement with the drum, while decreasing the spring tension will have the opposite effect. While the actual setting is determined by a trial and adjustment procedure, the knob 116 may be provided with a scale to facilitate the adjustment.

Regardless of the spring setting the operation is broadly as follows: Centrifugal force acting upon the weights is transmitted to the control disc in the form of torque, the total torque being the sum of the torques from the individual weights. This torque is divided, a portion being directly applied to the springs and a second portion being applied to the brake levers 81, 82 by the pin-and-slot pivot connections previously described. As the speed continues to increase, the springs expand, "lowering" the brake shoes into contact with the drum. The resulting braking effect reduces the speed and establishes an equilibrium condition. Subsequently, any tendency for the governor to be rotated by the motor at a speed greater or less than the equilibrium value for which the governor has been set, causes braking to be increased or decreased until the equilibrium speed is reestablished, with dissipation of the excess energy at the surface of the brake drum. While the device is particularly useful in connection with spring motors having limited torque, it will be apparent that any heat which may be generated at the brake drum is quickly and efficiently dissipated in the housing and the surrounding atmosphere. Consequently, the governor may be employed even where speed regulation requires dissipiation of substantial amounts of energy.

It is one of the features inherent in the above construction that the constant speed characteristic is maintained, regardless of the position in which the governor may be oriented. This is an especially useful feature in a hand-held recording device in which the position of orientation may be changed constantly during normal use. This is contrasted with conventional types of governors in which weights are employed to act individually upon brake shoes and in which it is possible for one brake shoe to exert more braking effect than another. In the present device the centrifugal forces exerted by the two weights are added together in the control disc 91. Thus, when the governor is operated vertically or "on edge," the effect of gravity, which acts to increase the force exerted by the weight in the lower position while decreasing the force exerted by the weight in the upper position, is cancelled out. Consequently, the total force applied as a torque to the two brake levers 81, 82 remains constant.

The control disc will continue to occupy a centered position with respect to the axis of rotation as long as the reaction forces at the two brake shoes are exactly the same. It is, however, one of the important features of the device that the braking forces exerted by the brake shoes tend to be constantly equalized. Thus, if one of the brake shoes should apply a braking force which is greater than the force applied by the other shoe, the control disc tends to depart from its precisely centered position so that the more lightly loaded brake shoe tends to be moved into closer engagement with the brake drum, thereby bringing the two braking torques into balance or equality with one another.

The above will be made clear by reference to Fig. 8, which shows diagrammatically the action which tends to occur when one of the brake shoes, for example, the brake shoe 85, applies less than its share of braking force. As a result of the decreased force, the reaction force occurring at pivot 95 becomes less than that occurring at the opposite pivot 96. This unbalance tends to cause the control disc (under the influence of the torques from the weights), to rotate bodily about the pivot 96 from the position shown full to the position indicated by the dotted lines in Fig. 8. Absent the brake drum, the brake shoe would tend to press outwardly into the position shown at 81a in Fig. 8. However, the brake shoe is constrained against such movement by the drum and the unbalance therefore shows up as increased torque on the brake lever. Such increase continues until the braking force exerted by the brake shoe 85 increases up to that exerted by the brake shoe 86, thus balance between the two brake shoes tends to be constantly maintained.

The effect of the above may be further understood by the following: Assume that the thickness of one of the brake shoes, for example the shoe 85, either initially or as the result of wear, is less than that of the other so that the shoe 86 tends to engage the brake first and thus assume most of the load. Under such conditions take-up will occur, with the relatively unloaded shoe 85 moving an additional amount and with accompanying bodily pivoting of the control member 91 about the pivot 96, until balance is established. It will be apparent to one skilled in the art that the same take-up or equalization takes place in the event that the brake levers 81, 82 are of slightly different size or shape or have pivots with unequal clearance or play. In short, take-up will occur at either brake lever requiring it, tending to produce immediate and constant equalization of braking force. Consequently, the parts need not be made or assembled with high precision, making the device non-critical and thus ideally suited for inexpensive quantity production.

The same factors which cause the governor to be immune to the force of gravity also cause it to be immune to the gravity-like yet random forces resulting from shock and vibration. Thus constant speed and freedom from "wow" is assured in the case of a hand-held recorder or the like which is constantly bumped and jarred while recording is taking place.

Because of its compact unitary construction, the device is not by any means limited to use in the particular environment and may be employed almost universally in connection with spring motors and the like where a constant speed is desired.

The term "pin and slot" connection in the following claims is used for convenience and in a generic sense to cover a pivot connection characterized by freedom of movement in the radial direction.

We claim as our invention:

1. In a speed governor the combination comprising a stationary brake drum, a rotatable input shaft arranged coaxially with respect to the brake drum, a rotor frame affixed to said shaft, a plurality of weights mounted on said frame for movement radially in response to centrifugal force, a control member coupled to said weights and mounted for relative angular movement with respect to said frame in response to outward movement of said weights, a pair of brake levers centrally pivoted on said frame and having brake shoes at their outer ends for engaging said drum, said brake levers having cranked pivot connections with said control member at their respective inner ends for radial movement of the brake shoes in response to said angular movement of the control member, the control member being free for bodily pivoting about either of said cranked pivot connections in response to any unbalance in the braking force exerted by said brake shoes.

2. In a speed governor the combination comprising a cylindrical brake drum, a rotatable input shaft arranged coaxially with respect to the drum, a rotor frame rigidly mounted on said shaft, a control member arranged generally coaxially with respect to the shaft, a pair of flyweights mounted at diametrically opposite points on said frame, said weights being connected to the control member so that radially outward movement of the weights tends to produce angular movement of said control member, a pair of brake shoes pivoted at diametrically opposite points on said frame, said brake shoes each having a pin-and-slot connection with said control member for applying outward braking pressure against said brake drum as a result of the centrifugal force developed in said weights, and springs arranged to urge the brake shoes inwardly, said control member being floatingly mounted to permit limited bodily rotation of the control about either one of said pin-and-slot connections for equalization of the braking forces applied to said brake shoes.

3. In a speed governor the combination comprising a cylindrical brake drum, a rotatable input shaft arranged coaxially with respect thereto, a rotor frame rigidly mounted on said shaft, a plurality of weights pivoted to said frame for outward movement in response to centrifugal force, a control disc coaxially arranged with respect to said frame, a plurality of brake shoes pivoted to said frame for applying outward braking pressure against said drum, said weights and said brake shoes being pivoted to said control disc so that the outward movement of the weights resulting from increased speed results in rotation of the control member relative to the frame and an increase in the braking pressure applied by said brake shoes against the drum, an adjusting disc mounted adjacent said control disc, means including springs connected to said adjusting disc for urging the brake shoes inwardly, and a friction connection between the control disc and the adjusting disc for relatively positioning the same and thereby adjusting the force exerted by said springs.

4. In a speed governor the combination comprising a stationary brake drum, an input shaft arranged coaxially with respect thereto, a pair of weights and a pair of brake shoes eccentrically pivoted to said frame at symmetrically spaced points thereon, an annular coupling member arranged generally coaxially with respect to said shaft and having a cranked pin-and-slot connection with said weights and said brake shoes so that outward movement of the weights is accompanied by outward braking force exerted by said brake shoes, an annular adjusting member mounted adjacent said coupling member, springs interposed between the adjusting member and said brake shoes, said adjusting member having a circular rack on the periphery thereof, and means including a friction coupling for maintaining said control disc and said adjusting disc in positioned engagement with one another, said control disc having a registering aperture for permitting insertion of an adjusting pinion for engagement with said rack to rotate said adjusting disc and thereby effect a change in the force exerted by said springs upon said brake shoes.

5. In a speed governor the combination comprising a brake drum, a rotatable input shaft arranged coaxially with respect to the brake drum, a rotor frame affixed to said shaft, a plurality of weights mounted on said frame for movement radially in response to centrifugal force, a control member arranged coaxially with respect to said shaft, means for coupling said control member to said weights so that the control member undergoes angular movement with respect to said frame in response to outward movement of said weights, a pair of brake shoes mounted in diametric positions on said frame and having provision for radial movement with respect thereto, means including individual pivot points for coupling the respective brake shoes to said control member so that said brake shoes are urged outwardly toward the drum in response to the relative angular movement of the control member, and means for biasing said weights and said brake shoes radially inward, said control member having lateral clearance with respect to the shaft pemit bodily rotation of said control member about the pivot point associated with the brake shoe offering the greater reaction thereby to augment the braking force at the other of said brake shoes.

6. In a speed governor the combination comprising a brake drum, a rotatable input shaft arranged coaxially with respect to the brake drum, a rotor frame affixed to said shaft, a control member adjacent said frame in a generally coaxial position, said control member being movable angularly with respect to said frame and having provision for limited transaxial movement relative thereto, weight-coupling means including a plurality of weights coupled to said frame and said control member for causing the control member to move angularly relative to the frame in response to outward movement of said weights, a pair of brake shoes mounted in diametric positions on said frame and having provision for radial movement with respect thereto, shoe-coupling means including individual pivot points for coupling the respective brake shoes to said control member so that said brake shoes are urged outwardly toward the drum in response to the relative angular movement of the control member, and means for biasing said weights and said brake shoes radially inward, said weight-coupling means being so arranged as to permit limited bodily rotation of said control member about the pivot point associated with the brake shoe offering the greater reaction so that the braking force at the other of said brake shoes is augmented tending to equalize the braking torque exerted by the respective shoes.

References Cited in the file of this patent

UNITED STATES PATENTS 893,691    Younkman ------------ July 21, 1908